하지 않음

United States Patent
Cao et al.

(10) Patent No.: US 11,610,354 B2
(45) Date of Patent: *Mar. 21, 2023

(54) JOINT AUDIO-VIDEO FACIAL ANIMATION SYSTEM

(71) Applicant: Snap Inc., Santa Monica, CA (US)

(72) Inventors: Chen Cao, Los Angeles, CA (US); Xin Chen, Torrance, CA (US); Wei Chu, Culver City, CA (US); Zehao Xue, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/349,015

(22) Filed: Jun. 16, 2021

(65) Prior Publication Data

US 2021/0312681 A1  Oct. 7, 2021

Related U.S. Application Data

(63) Continuation of application No. 16/749,753, filed on Jan. 22, 2020, now Pat. No. 11,120,597, which is a continuation of application No. 15/858,992, filed on Dec. 29, 2017, now Pat. No. 10,586,368.

(60) Provisional application No. 62/577,548, filed on Oct. 26, 2017.

(51) Int. Cl.
| | |
|---|---|
| *G06T 13/20* | (2011.01) |
| *G06T 13/40* | (2011.01) |
| *H04L 51/08* | (2022.01) |
| *H04R 27/00* | (2006.01) |

(Continued)

(52) U.S. Cl.
CPC ............ *G06T 13/205* (2013.01); *G06T 13/40* (2013.01); *G06V 40/161* (2022.01); *G06V 40/176* (2022.01); *G10L 21/10* (2013.01); *H04L 51/08* (2013.01); *H04R 27/00* (2013.01); *G10L 2021/105* (2013.01)

(58) Field of Classification Search
None
See application file for complete search history.

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| 6,223,165 B1 | 4/2001 | Lauffer |

(Continued)

FOREIGN PATENT DOCUMENTS

| | | |
|---|---|---|
| CA | 2690826 A1 | 2/2003 |
| CN | 109863532 A | 6/2019 |

(Continued)

OTHER PUBLICATIONS

Karras et al., "Audio-Driven Facial Animation by Joint End-to-End Learning of Pose and Emotion" (Year: 2017).*

(Continued)

*Primary Examiner* — Hilina K Demeter
(74) *Attorney, Agent, or Firm* — Schwegman Lundberg & Woessner, P.A.

(57) ABSTRACT

The present invention relates to a joint automatic audio visual driven facial animation system that in some example embodiments includes a full scale state of the art Large Vocabulary Continuous Speech Recognition (LVCSR) with a strong language model for speech recognition and obtained phoneme alignment from the word lattice.

20 Claims, 9 Drawing Sheets

(51) Int. Cl.
  *G10L 21/10*   (2013.01)
  *G06V 40/16*   (2022.01)

(56) References Cited

U.S. PATENT DOCUMENTS

| | | | |
|---|---|---|---|
| 6,735,566 B1 | 5/2004 | Brand | |
| 6,772,195 B1 | 8/2004 | Hatlelid et al. | |
| 6,842,779 B1 | 1/2005 | Nishizawa | |
| 7,168,953 B1* | 1/2007 | Poggio | G06T 13/40 |
| | | | 704/E21.02 |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van et al. | |
| 7,859,551 B2 | 12/2010 | Bulman et al. | |
| 7,885,931 B2 | 2/2011 | Seo et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,146,005 B2 | 3/2012 | Jones et al. | |
| 8,151,191 B2 | 4/2012 | Nicol | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,581,911 B2 | 11/2013 | Becker et al. | |
| 8,597,121 B2 | 12/2013 | del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,890,926 B2 | 11/2014 | Tandon et al. | |
| 8,892,999 B2 | 11/2014 | Nims et al. | |
| 8,924,250 B2 | 12/2014 | Bates et al. | |
| 8,963,926 B2 | 2/2015 | Brown et al. | |
| 8,989,786 B2 | 3/2015 | Feghali | |
| 9,086,776 B2 | 7/2015 | Ye et al. | |
| 9,105,014 B2 | 8/2015 | Collet et al. | |
| 9,241,184 B2 | 1/2016 | Weerasinghe | |
| 9,256,860 B2 | 2/2016 | Herger et al. | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,402,057 B2 | 7/2016 | Kaytaz et al. | |
| 9,412,192 B2 | 8/2016 | Mandel et al. | |
| 9,460,541 B2 | 10/2016 | Li et al. | |
| 9,489,760 B2 | 11/2016 | Li et al. | |
| 9,503,845 B2 | 11/2016 | Vincent | |
| 9,508,197 B2 | 11/2016 | Quinn et al. | |
| 9,544,257 B2 | 1/2017 | Ogundokun et al. | |
| 9,576,400 B2 | 2/2017 | Van Os et al. | |
| 9,589,357 B2 | 3/2017 | Li et al. | |
| 9,592,449 B2 | 3/2017 | Barbalet et al. | |
| 9,648,376 B2 | 5/2017 | Chang et al. | |
| 9,697,635 B2 | 7/2017 | Quinn et al. | |
| 9,706,040 B2 | 7/2017 | Kadirvel et al. | |
| 9,744,466 B2 | 8/2017 | Fujioka | |
| 9,746,990 B2 | 8/2017 | Anderson et al. | |
| 9,749,270 B2 | 8/2017 | Collet et al. | |
| 9,792,714 B2 | 10/2017 | Li et al. | |
| 9,839,844 B2 | 12/2017 | Dunstan et al. | |
| 9,883,838 B2 | 2/2018 | Kaleal, III et al. | |
| 9,898,849 B2 | 2/2018 | Du et al. | |
| 9,911,073 B1 | 3/2018 | Spiegel et al. | |
| 9,936,165 B2 | 4/2018 | Li et al. | |
| 9,959,037 B2 | 5/2018 | Chaudhri et al. | |
| 9,980,100 B1 | 5/2018 | Charlton et al. | |
| 9,990,373 B2 | 6/2018 | Fortkort | |
| 10,039,988 B2 | 8/2018 | Lobb et al. | |
| 10,097,492 B2 | 10/2018 | Tsuda et al. | |
| 10,116,598 B2 | 10/2018 | Tucker et al. | |
| 10,155,168 B2 | 12/2018 | Blackstock et al. | |
| 10,242,477 B1 | 3/2019 | Charlton et al. | |
| 10,242,503 B2 | 3/2019 | McPhee et al. | |
| 10,262,250 B1 | 4/2019 | Spiegel et al. | |
| 10,362,219 B2 | 7/2019 | Wilson et al. | |
| 10,475,225 B2 | 11/2019 | Park et al. | |
| 10,504,266 B2 | 12/2019 | Blattner et al. | |
| 10,573,048 B2 | 2/2020 | Ni et al. | |
| 10,586,368 B2 | 3/2020 | Cao et al. | |
| 10,657,701 B2 | 5/2020 | Osman et al. | |
| 11,120,597 B2 | 9/2021 | Cao et al. | |
| 2002/0067362 A1 | 6/2002 | Agostino Nocera et al. | |
| 2002/0087329 A1* | 7/2002 | Massaro | G06T 13/205 |
| | | | 704/275 |
| 2002/0169644 A1 | 11/2002 | Greene | |
| 2004/0120554 A1* | 6/2004 | Lin | G06V 40/20 |
| | | | 704/E21.02 |
| 2005/0162419 A1 | 7/2005 | Kim et al. | |
| 2005/0020661 A1 | 9/2005 | Cordelli | |
| 2006/0290699 A1* | 12/2006 | Dimtrva | H04N 21/2368 |
| | | | 345/473 |
| 2006/0294465 A1 | 12/2006 | Ronen et al. | |
| 2007/0113181 A1 | 5/2007 | Blattner et al. | |
| 2007/0168863 A1 | 7/2007 | Blattner et al. | |
| 2007/0176921 A1 | 8/2007 | Iwasaki et al. | |
| 2008/0158222 A1 | 7/2008 | Li et al. | |
| 2009/0016617 A1 | 1/2009 | Bregman-Amitai et al. | |
| 2009/0044113 A1* | 2/2009 | Jones | G06T 13/40 |
| | | | 715/707 |
| 2009/0055484 A1 | 2/2009 | Vuong et al. | |
| 2009/0070688 A1 | 3/2009 | Gyorfi et al. | |
| 2009/0099925 A1 | 4/2009 | Mehta et al. | |
| 2009/0106672 A1 | 4/2009 | Burstrom | |
| 2009/0158170 A1 | 6/2009 | Narayanan et al. | |
| 2009/0177976 A1 | 7/2009 | Bokor et al. | |
| 2009/0202114 A1 | 8/2009 | Morin et al. | |
| 2009/0265604 A1 | 10/2009 | Howard et al. | |
| 2009/0300525 A1 | 12/2009 | Jolliff et al. | |
| 2009/0303984 A1 | 12/2009 | Clark et al. | |
| 2010/0007665 A1* | 1/2010 | Smith | G06T 13/40 |
| | | | 345/473 |
| 2010/0011422 A1 | 1/2010 | Mason et al. | |
| 2010/0023885 A1 | 1/2010 | Reville et al. | |
| 2010/0115426 A1 | 5/2010 | Liu et al. | |
| 2010/0162149 A1 | 6/2010 | Sheleheda et al. | |
| 2010/0203968 A1 | 8/2010 | Gill et al. | |
| 2010/0227682 A1 | 9/2010 | Reville et al. | |
| 2011/0093780 A1 | 4/2011 | Dunn | |
| 2011/0115798 A1* | 5/2011 | Nayar | G06T 13/40 |
| | | | 345/473 |
| 2011/0148864 A1 | 6/2011 | Lee et al. | |
| 2011/0227931 A1* | 9/2011 | Lu | G06T 13/205 |
| | | | 345/473 |
| 2011/0239136 A1 | 9/2011 | Goldman et al. | |
| 2012/0113106 A1 | 5/2012 | Choi et al. | |
| 2012/0124458 A1 | 5/2012 | Cruzada | |
| 2012/0130717 A1 | 5/2012 | Xu et al. | |
| 2012/0323581 A1 | 12/2012 | Strietzel et al. | |
| 2013/0103760 A1 | 4/2013 | Golding et al. | |

(56) References Cited

U.S. PATENT DOCUMENTS

| | | |
|---|---|---|
| 2013/0201187 A1 | 8/2013 | Tong et al. |
| 2013/0235045 A1 | 9/2013 | Corazza et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2015/0213604 A1 | 7/2015 | Li et al. |
| 2015/0286858 A1 | 10/2015 | Shaburov et al. |
| 2015/0379752 A1 | 12/2015 | Li et al. |
| 2016/0005206 A1 | 1/2016 | Li et al. |
| 2016/0134840 A1 | 5/2016 | Mcculloch |
| 2016/0234149 A1 | 8/2016 | Tsuda et al. |
| 2016/0300379 A1 | 10/2016 | Du et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0243387 A1 | 8/2017 | Li et al. |
| 2017/0310934 A1 | 10/2017 | Du et al. |
| 2017/0312634 A1 | 11/2017 | Ledoux et al. |
| 2018/0027307 A1 | 1/2018 | Ni et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0253881 A1 | 9/2018 | Edwards et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0130628 A1 | 5/2019 | Cao et al. |
| 2019/0188920 A1 | 6/2019 | Mcphee et al. |
| 2020/0160580 A1 | 5/2020 | Cao et al. |

FOREIGN PATENT DOCUMENTS

| | | |
|---|---|---|
| CN | 110168478 A | 8/2019 |
| CN | 111279413 A | 6/2020 |
| EP | 1203352 A1 | 5/2002 |
| EP | 1203352 B1 | 12/2003 |
| EP | 2184092 A2 | 5/2010 |
| EP | 2760023 A1 | 7/2014 |
| JP | 2001230801 A | 8/2001 |
| JP | 2003529861 | 10/2003 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019084481 A1 | 5/2019 |
| WO | WO-2019089613 A1 | 5/2019 |

OTHER PUBLICATIONS

Xie et al. "A coupled HMM approach to video-realistic speech animation" (Year: 2006).*

Pham et al. "Speec-driven 3D Facial Animation with Implicit Emotional Awareness: A Deep Learning Approach" (Year: 2017).*

U.S. Appl. No. 15/858,992 U.S. Pat. No. 10,586,368, filed Dec. 29, 2017, Joint Audio-Video Facial Animation System.

U.S. Appl. No. 16/749,753, filed Jan. 22, 2020, Joint Audio-Video Facial Animation System.

"Korean Application Serial No. 10-2020-7011516, Notice of Preliminary Rejection dated Jul. 29, 2021", w/ English Translation, 12 pgs.

"European Application Serial No. 18871149.3, Response filed Jun. 11, 2021 to Extended European Search Report dated Nov. 20, 2020", 20 pgs.

"Korean Application Serial No. 10-2020-7011516, Response filed Oct. 29, 2021 to Office Action dated Jul. 29, 2021", w/ English Claims, 24 pgs.

"Korean Application Serial No. 10-2020-7011516, Final Office Action dated Mar. 23, 2022", w/ English Translation, 7 pgs.

"U.S. Appl. No. 15/858,992, Examiner Interview Summary dated Jul. 16, 2019", 3 pgs.

"U.S. Appl. No. 15/858,992, Examiner Interview Summary dated Nov. 5, 2018", 3 pgs.

"U.S. Appl. No. 15/858,992, Final Office Action dated Feb. 26, 2019", 15 pgs.

"U.S. Appl. No. 15/858,992, Final Office Action dated Sep. 20, 2019", 15 pgs.

"U.S. Appl. No. 15/858,992, Non Final Office Action dated Jun. 26, 2019", 14 pgs.

"U.S. Appl. No. 15/858,992, Non Final Office Action dated Oct. 4, 2018", 13 pgs.

"U.S. Appl. No. 15/858,992, Notice of Allowance dated Oct. 30, 2019", 10 pgs.

"U.S. Appl. No. 15/858,992, Response filed May 28, 2019 to Final Office Action dated Feb. 26, 2019", 11 pgs.

"U.S. Appl. No. 15/858,992, Response filed Jul. 16, 2019 to Non Final Office Action dated Jun. 26, 2019", 11 pgs.

"U.S. Appl. No. 15/858,992, Response filed Oct. 17, 2019 to Final Office Action dated Sep. 20, 2019", 11 pgs.

"U.S. Appl. No. 15/858,992, Response filed Nov. 29, 2018 to Non Final Office Action dated Oct. 4, 2018", 11 pgs.

"U.S. Appl. No. 16/749,753, Advisory Action dated Dec. 14, 2020", 3 pgs.

"U.S. Appl. No. 16/749,753, Final Office Action dated Sep. 29, 2020", 20 pgs.

"U.S. Appl. No. 16/749,753, Non Final Office Action dated Jan. 19, 2021", 20 pgs.

"U.S. Appl. No. 16/749,753, Non Final Office Action dated Jul. 10, 2020", 19 pgs.

"U.S. Appl. No. 16/749,753, Notice of Allowance dated May 13, 2021", 9 pgs.

"U.S. Appl. No. 16/749,753, Response filed Feb. 23, 2021 to Non Final Office Action dated Jan. 19, 2021", 11 pgs.

"U.S. Appl. No. 16/749,753, Response filed Jul. 14, 2020 to Non Final Office Action dated Jul. 10, 2020", 10 pgs.

"U.S. Appl. No. 16/749,753, Response filed Nov. 30, 2020 Final Office Action dated Sep. 29, 2020", 10 pgs.

"European Application Serial No. 18871149.3, Extended European Search Report dated Nov. 20, 2020", 15 pgs.

"International Application Serial No. PCT/US2018/057827, International Preliminary Report on Patentability dated May 7, 2020", 8 pgs.

"International Application Serial No. PCT/US2018/057827, International Search Report dated Feb. 19, 2019", 3 pgs.

"International Application Serial No. PCT/US2018/057827, Written Opinion dated Feb. 19, 2019", 6 pgs.

Breton, et al., "FaceEngine a 3D Facial Animation Engine for Real Time Applications", Proceedings of the 6th International Conference on 3D Web Technology, pp. 15-22, (2001), 8 pgs.

Guiterrez-Osuna, R, et al., "Speech-Driven Facial Animation with Realistic Dynamics", IEEE Transactions on Multimedia, 7(1), (2005), 33-42.

Hongying, Meng, et al., "Time-Delay Neural Network for Continuous Emotional Dimension Prediction from Facial Expression Sequences", IEEE Transactions on Cybernetics, vol. 46, No. 4, (Apr. 2016), 916-929.

(56) References Cited

OTHER PUBLICATIONS

Kakihara, Kiyotsugu, et al., "Speech-to-Face Movement Synthesis Based on HMM", Proceedings of the 2000 IEEE International Conference on Multimedia and Expo, (2000), 427-430.

Supasorn, Suwajanakorn, et al., "Synthesizing Obama: Learning Lip Sync from Audio", ACM Transactions on Graphics, vol. 36, No. 4, Article 95, (Jul. 2017), 1-13.

Thavesak, Chuensaichol, et al., "Thai Speech-Driven Facial Animation", 2011 Second International Conference on Culture and Computing, IEEE, (2011), 121-122.

"European Application Serial No. 18871149.3, Communication Pursuant to Article 94(3) EPC dated Aug. 9, 2022", 6 pgs.

"Korean Application Serial No. 10-2020-7011516, Office Action dated May 25, 2022", w/English Translation, 10 pgs.

Aubert, Xavier L, "LAn overview of decoding techniques for large vocabulary continuous speech recognition", Computer Speech and Language, 16, (2002), 89-114.

* cited by examiner

```
600
```

RECEIVING AUDIO DATA AND VIDEO DATA AT A CLIENT DEVICE
602

DETERMINING A PHONEME SEQUENCE OF THE AUDIO DATA
604

DETERMINING LOCATIONS OF A SET OF FACIAL LANDMARKS BASED ON THE VIDEO DATA
606

GENERATING A FIRST FACIAL MODEL BASED ON THE LOCATIONS OF THE SET OF FACIAL LANDMARKS
608

GENERATING A SECOND FACIAL MODEL BASED ON THE PHONEME SEQUENCE OF THE AUDIO DATA
610

CONSTRUCTING A COMPOSITE FACIAL MODEL BASED ON THE FIRST FACIAL MODEL AND THE SECOND FACIAL MODEL
612

CAUSING DISPLAY OF THE COMPOSITE FACIAL MODEL AT THE CLIENT DEVICE
614

FIG. 6

```
                    ┌─────────────────────────────────────────┐
                    │ DETECTING A LOSS OF AUDIO DATA AND      │
                    │ VIDEO DATA                              │
                    │ 702                                     │
                    └─────────────────────────────────────────┘
                                      │
                                      ▼
                    ┌─────────────────────────────────────────┐
                    │ IDENTIFYING A FIRST FRAME OF THE VIDEO  │
                    │ DATA                                    │
                    │ 704                                     │
                    └─────────────────────────────────────────┘
                                      │
                                      ▼
                    ┌─────────────────────────────────────────┐
                    │ DETERMINING LOCATIONS OF THE SET OF     │
                    │ FACIAL LANDMARKS WITHIN THE FIRST FRAME │
                    │ OF THE VIDEO DATA                       │
                    │ 706                                     │
                    └─────────────────────────────────────────┘
                                      │
                                      ▼
                    ┌─────────────────────────────────────────┐
                    │ DEFINING A NEUTRAL EXPRESSION BASED ON  │
                    │ THE LOCATIONS OF THE SET OF FACIAL      │
                    │ LANDMARKS WITHIN THE FIRST FRAME OF THE │
                    │ VIDEO DATA                              │
                    │ 708                                     │
                    └─────────────────────────────────────────┘
                                      │
                                      ▼
                    ┌─────────────────────────────────────────┐
                    │ ALTERING A PRESENTATION OF THE          │
                    │ COMPOSITE FACIAL MODEL BASED ON THE     │
                    │ NEUTRAL EXPRESSION, IN RESPONSE TO THE  │
                    │ LOSS OF THE AUDIO DATA AND VIDEO DATA   │
                    │ 710                                     │
                    └─────────────────────────────────────────┘
```

*FIG. 7*

JOINT AUDIO-VIDEO FACIAL ANIMATION SYSTEM

PRIORITY CLAIM

This application is a continuation of and claims the benefit of priority to U.S. patent application Ser. No. 16/749,753, filed on Jan. 22, 2020, which is a continuation of and claims the benefit of priority to U.S. patent application Ser. No. 15/858,992, filed on Dec. 29, 2017, which claims the benefit of priority to U.S. Provisional Patent Application Ser. No. 62/577,548, filed on Oct. 26, 2017, the benefit of priority of each of which are claimed hereby, and each of which are incorporated by reference herein in their entirety.

TECHNICAL FIELD

Embodiments of the present disclosure relate generally to mobile computing technology and, more particularly, but not by way of limitation, to systems for tracking facial landmarks and generating a 3D facial model based on audio and video data.

BACKGROUND

Research has shown that facial tracking and performance capturing technology have had significant impacts in a broad range of fields that include computer gaming, animations, entertainment, human-computer interface. For example, some of the research has shown that users interacting with a digital avatar, such as an animated face, are 30% more trustworthy than compared with the same interactions with text-only scripts.

Existing facial animation systems follow one of two techniques: performance-based facial animation; or speech-driven facial animation. Performance-based facial animation is currently the most popular technique utilized to generate realistic character facial animation for games and movies. While effective, such techniques require special equipment such as physical markers on a subject, structured light, and camera arrays. As a result, such techniques are impractical for ordinary users.

Speech-driven facial animation is also a common technique, which functions by first mapping raw speech features such as Mel-Frequency Cepstral Coefficients (MPCC) to predefined visual parameters. This technique requires large volumes of corresponding audio and video training data for better generalized performance. The speech is mapped into a phoneme or phoneme state feature and then to the visual parameters. While this method is easier to perform, accuracy depends greatly upon the volume of training data available.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 6 is a flowchart illustrating a method for generating an animated facial model based on audio and video data, according to certain example embodiments.

FIG. 7 is a flowchart illustrating a method for generating an animated facial model based on audio and video data, according to certain example embodiments.

DETAILED DESCRIPTION

Figure 1:
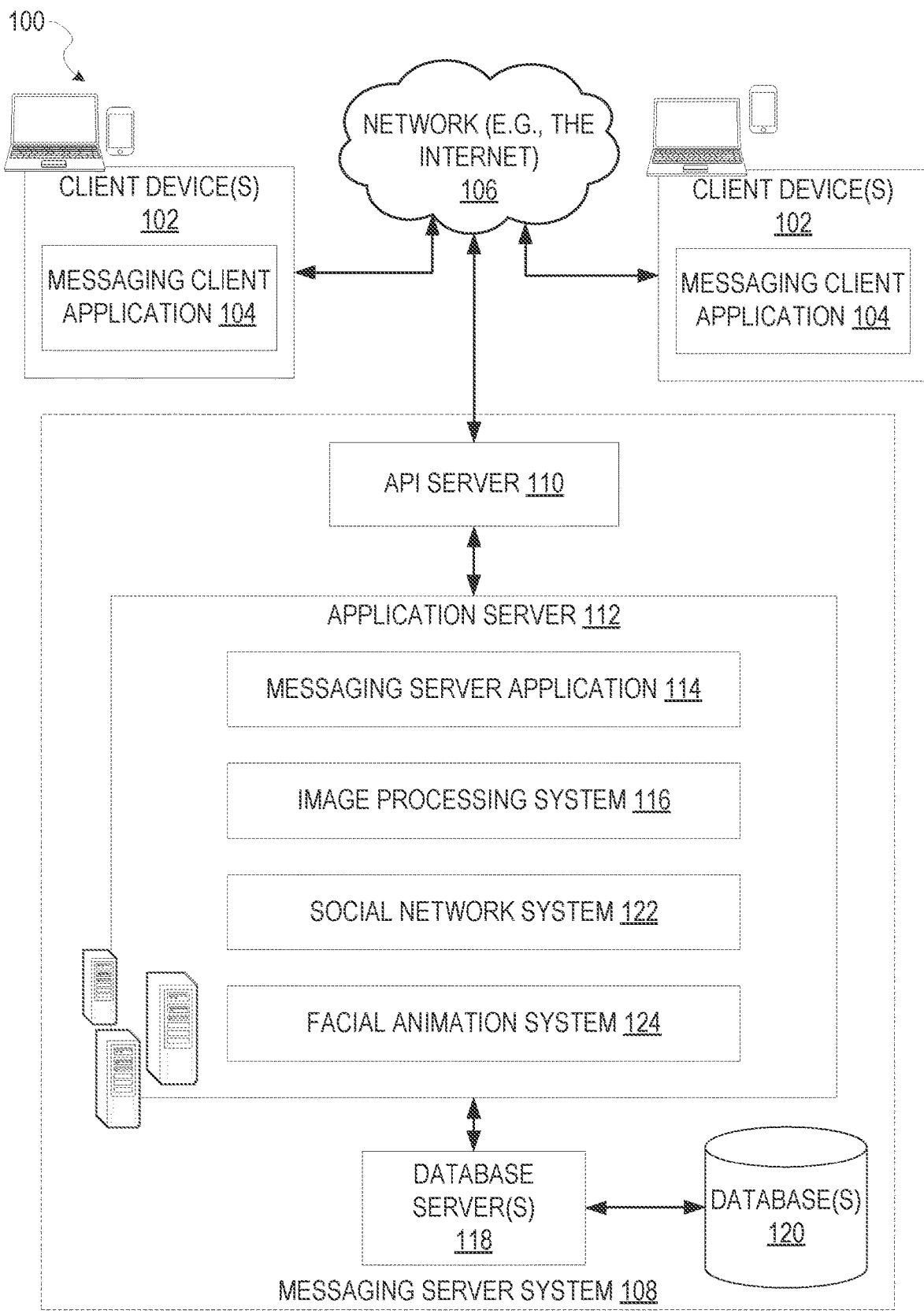
FIG. 1 is a block diagram showing an example messaging system for exchanging data (e.g., messages and associated content) over a network in accordance with some embodiments, wherein the messaging system includes a chat presence system.

The present invention relates to a joint automatic audio visual driven facial animation system that in some example embodiments includes a full scale state of the art Large Vocabulary Continuous Speech Recognition (LVCSR) with a strong language model for speech recognition and obtained phoneme alignment from the word lattice. Knowledge guided 3D blend shapes modeling is used for each phoneme, utilizing a 3D face modeling capture device to avoid collecting training data as well as introducing bias from computer vision generated blend shapes. To further improve quality, the system may apply computer vision generated tracking, and jointly synthesize the facial animation by combining both audio and video information.

Joint video-speech driven facial animation systems, as discussed herein, combine the advantages of video and speech by using both video and acoustic inputs to track 3D facial motion. The system may apply a full scale LVCSR model with a strong language model for word lattice generation and phoneme sequence estimation. Thus, the disclosed system solves technical problems existing in current regression models that have the disadvantages of requiring additional training data and including inherent inaccuracies from auto-generated facial regression target parameters.

In some example embodiments, the Joint Audio-Visual Driven Facial Animation System (Facial Animation System for short) includes a speech recognition module. In some embodiments, a Bi-Directional Long Short-Term Memory (BLS™) or a Time Delayed Neural Network (TDNN) are trained to convert input features to state posteriors. The input features may be obtained through passing framed raw audio signals (e.g., audio data that includes human speech) through a Mel-Scaled filter bank. Unlike common cross entropy criterion, the disclosed training procedure is a lattice-free version of MMI, in which the denominator state posteriors are obtained by the forward-backward algorithm on a hidden Markov model formed from a phone-level decoding graph. The numerator state posteriors are obtained by a similar forward-backward algorithm, limited to sequences corresponding to a transcript. For each output index of the neural net, a derivative of the difference between the numerator and the denominator occupation probabilities is calculated and propagated back to the network.

In some example embodiments, a trained acoustic model, a decision tree for mapping states to phones, a lexicon, and a pre-trained N-gram language model are used to generate a weighted finite state transducer (WFST). The outputs of the WFST are transferred into a lattice, wherein the most likely spoken word sequence is obtained through a Breadth-First Search (BFS). The final phone sequence, as well as a start time and an end time of each phone may be inferred from the most probable word sequence and lattice.

The Facial Animation System receives video data and tracks 2D facial landmarks depicted in the video data, which locate face feature points' 2D positions. Based on the tracked 2D landmarks, the Facial Animation System reconstructs a 3D face model and then tracks movements of the 3D face model.

2D facial landmarks correspond to semantic facial features of a human face, such as the contour of eyes, lips and eyebrows, the tip of a nose, etc. Based on the tracked 2D facial landmarks, the system reconstructs a user's 3D face model. In some embodiments, the system determines an identity of the user, wherein the identity defines the user's shape under neutral expression. With the identity, the system reconstructs user-specific expression blend shapes, which describe the shape of user's different expressions.

For example, a sample set of neutral face shapes may be captured and reconstructed, such that any neutral face shape "F" may be represented by a linear combination of principal components.

$$F = \overline{A} + \sum_{i=1}^{n} \alpha_i A_i,$$

As seen in the above formula, "F" may be described as the reconstructed face shape, while $\overline{A}$ and $\{A_i\}$ are the mean vector and PCA vectors of a morphable model, respectively, and a=$\{a_i\}$ are identity coefficients.

In some example embodiments, a first frame of a video is defined as a neutral expression of a user, with corresponding 2D facial landmarks vector P=$\{p_1, p_2, \ldots, p_{68}\}$ (assuming 68 facial landmarks). In other embodiments, any number of facial landmarks may be used. To match a 3D face to the 2D facial landmarks, the system transforms the reconstructed 3D face shape from object oriented to camera coordinate by applying a rigid rotation and translation, and then projects the transformed face shape into screen coordinates via the camera intrinsic matrix:

$$\hat{F}=\Pi(R \cdot F + t),$$

Where F^ is the projected face shape, $\Pi(\bullet)$ is the projection operator using the camera intrinsic matric, which is defined by the camera, R and t are rigid rotation and translation respectively. To match F^ with tracked facial landmarks P, the system pre-defines the corresponding vertex indices on 3D face shape (Green points in FIG. 2 (b)). Indices of landmarks may be updated along the face contour according to a current projected face shape F. With the corresponding vertex indices $\{v_1, v_2, \ldots, v_{68}\}$, the system formulates the errors matching 3D face to the 2D landmarks as:

$$E^f_{iden} = \sum_{k=1}^{68} \left\| \hat{F}^{(v_k)} - p_k \right\|^2,$$

Where F^ is the $v_k$-th vertex's position of face shape F^. The system regularizes the identity coefficients a=$\{a_i\}$ based on an estimated probability distribution of 3D morphable model's PCA.

With the reconstructed user-specific expression blend shapes, for each input frame at t, the system tracks the 3D face model parameters combining input video and speech. These parameters may for example include, rigid rotation, translation, and non-rigid facial expression coefficients.

Landmark terms are used to describe the alignment between the tracked 3D shape and 2D facial landmarks. The system reconstructs the expression face shape. For example, similar to the identity determination process, the system applies the rigid rotation and translation to the reconstructed face shape, and projects the shape into screen coordinates. With the projected face shape F^, the system may formulate the landmark term as:

$$E^f = \sum_{k=1}^{68} \left\| \hat{F}^{(v_k)} - p_k \right\|^2,$$

Phoneme terms are used to describe the alignment between tracked expression coefficients and estimates phonemes. The phoneme may be formulated as:

$$E^p = \|b^t - b_p{}^t\|^2.$$

Smooth terms are used to enhance the smoothness of tracking results. The smooth term may be formulated as:

$$E^s = \|b^t - b^{t-1}\|^2.$$

Putting these three terms together, we get a total energy function of:

$$E = E^f + \omega^p E^p + \omega^s E^s,$$

Where $w_p$ and $w_s$ balance the different terms. To optimize, the system applies similar coordinate-descent with the method in fitting identity: in each iteration, the system firstly optimizes rigid rotation and translation while fixing expression coefficients; and vice versa. In optimizing the blend shape coefficients, different form fitting identity, the system may constraint the range of each coefficient $B_i$. The system may apply gradient projection algorithms based on the BFGS solver to restrict the range of expression coefficients. The solved rigid parameters and expression coefficients may thus be utilized to generate the tracked 3D shape. In some example embodiments the 3D shape may for example include a 3D avatar, or "3D bitmoji," wherein the 3D bitmoji or avatar are animated and presented based on the tracked 3D shape derived from the input data that includes audio and video data received at a client device.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a facial animation system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
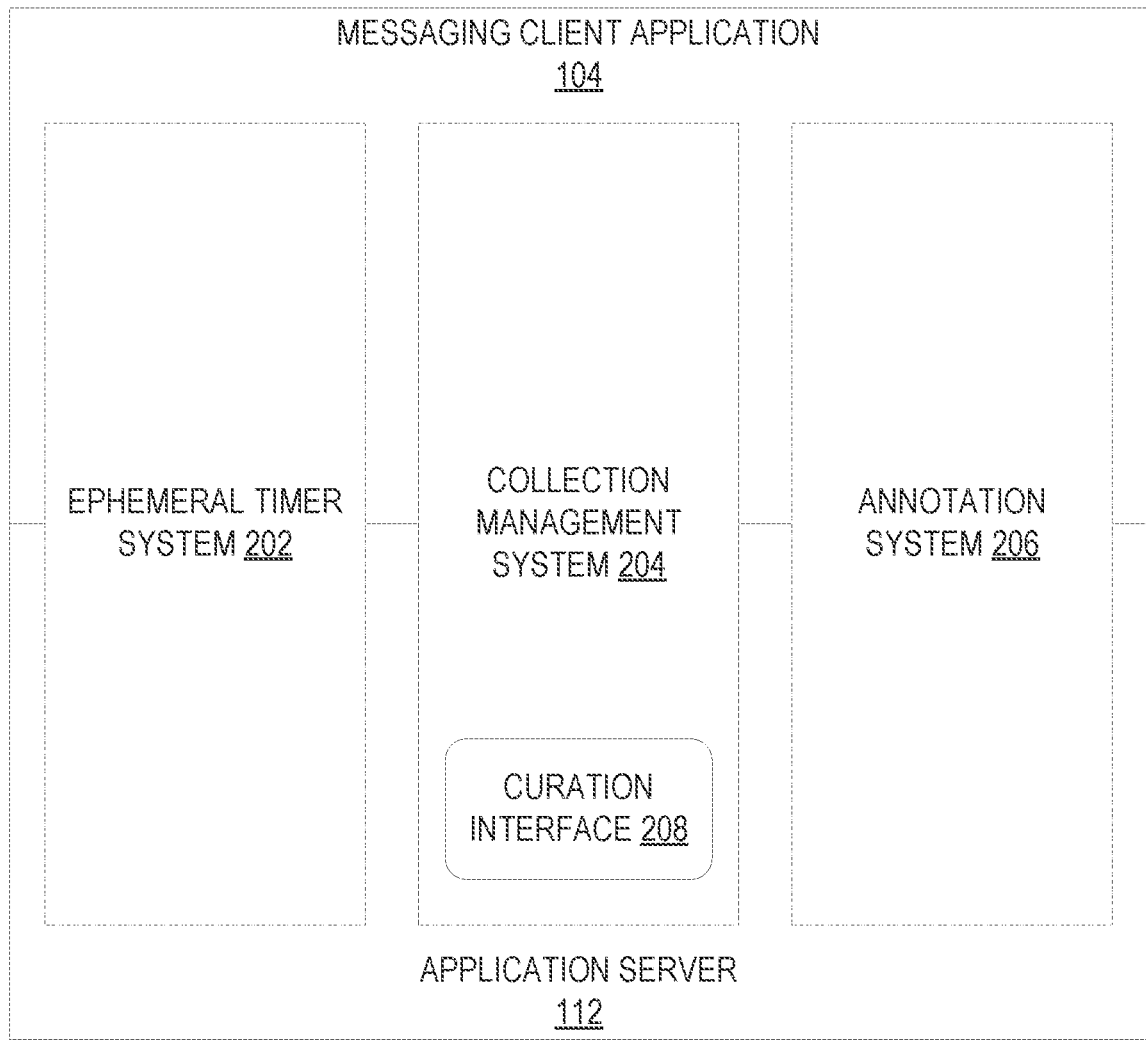
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the facial animation system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
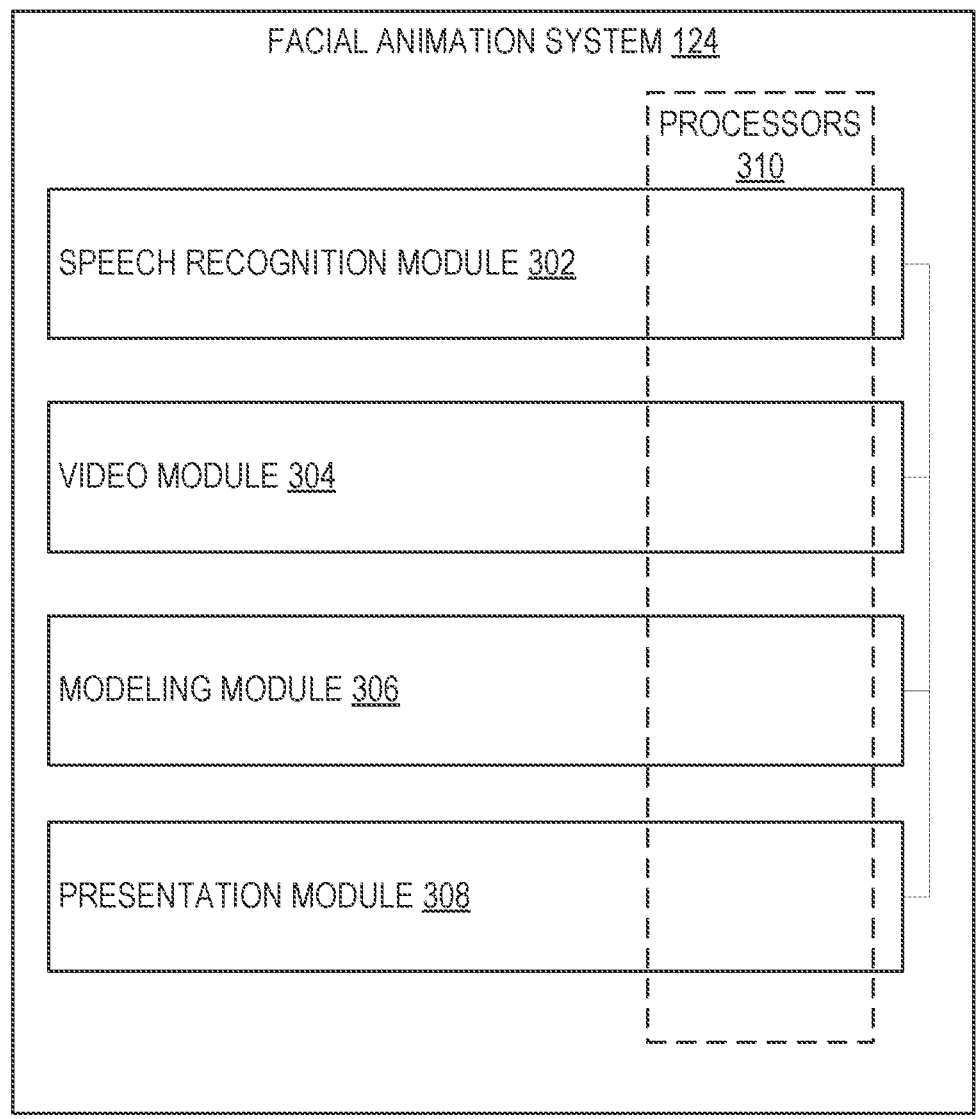
FIG. 3 is a block diagram illustrating various modules of a chat presence system, according to certain example embodiments.

FIG. 3 is a block diagram illustrating components of the facial animation system 124 that configure the facial animation system 124 to receive audio and video data, and generate a 3D facial model based on a combination of the audio and video data, according to some example embodiments. The facial animation system 124 is shown as including a speech recognition module 302, a video module 304, a modeling module 306, and presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the facial animation system 124 may physically include an arrangement of one or more of the processors 310 (e.g., a subset of or among the one or more processors of the machine) configured to perform the operations described herein for that module. As another example, any module of the facial animation system 124 may include software, hardware, or both, that configure an arrangement of one or more processors 310 (e.g., among the one or more processors of the machine) to perform the operations described herein for that module. Accordingly, different modules of the facial animation system 124 may include and configure different arrangements of such processors 310 or a single arrangement of such processors 310 at different points in time. Moreover, any two or more modules of the facial animation system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
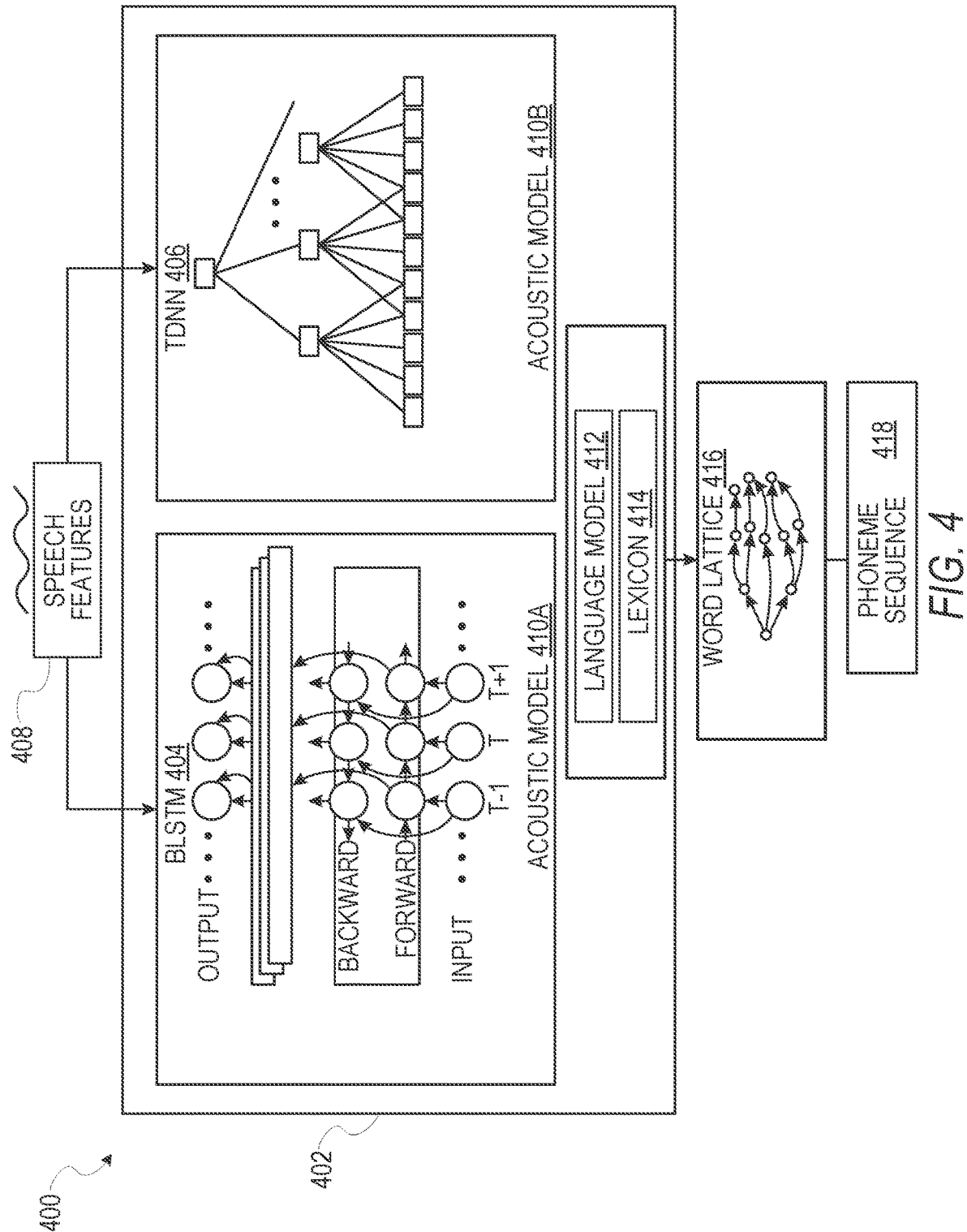
FIG. 4 is a diagram illustrating various operations performed by a speech recognition module, according to certain example embodiments.

FIG. 4 is a diagram 400 illustrating various operations performed by a speech recognition module (e.g., speech recognition module 302), according to certain example embodiments.

As seen in the diagram 400, a neural network 402, such as a Bi-directional Long Short-Term Memory (BLSTM 404) or a Time delayed Neural Network (TDNN 406), is trained to convert input features (e.g., speech features 408) into state posteriors. In some embodiments, the speech features are obtained by passing framed raw audio signals through a Mel frequency scaled filter bank. Unlike cross entropy criterion, the training procedure is a lattice-free version of MMI, in which the denominator state posteriors may be obtained by the forward-backward algorithm on an hidden Markov model formed from a phone-level decoding graph, and the numerator state posteriors are obtained by a similar forward-backward algorithm, but limited to sequences corresponding to the transcript.

For each output index of the neural network 402, a derivative of the difference between numerator and denominator occupation probabilities is calculated and propagated back to the neural network 402.

In the inferring stage, as illustrated in the diagram 400, the trained acoustic model (e.g., trained acoustic model 410A or 410B), a decision tree for mapping the states to phones (e.g., word lattice 416), a lexicon 414, and a pre-trained N-gram language model 412, are used to generate a weight finite state transducer (e.g., phoneme sequence 418).

From the word lattice 416, the most likely spoken word sequence may be obtained via Breadth First Search (BFS). The final phone sequence, as well as a start time and an end time of each phone may be inferred from the most probable word sequence and word lattice 416.

Figure 5:
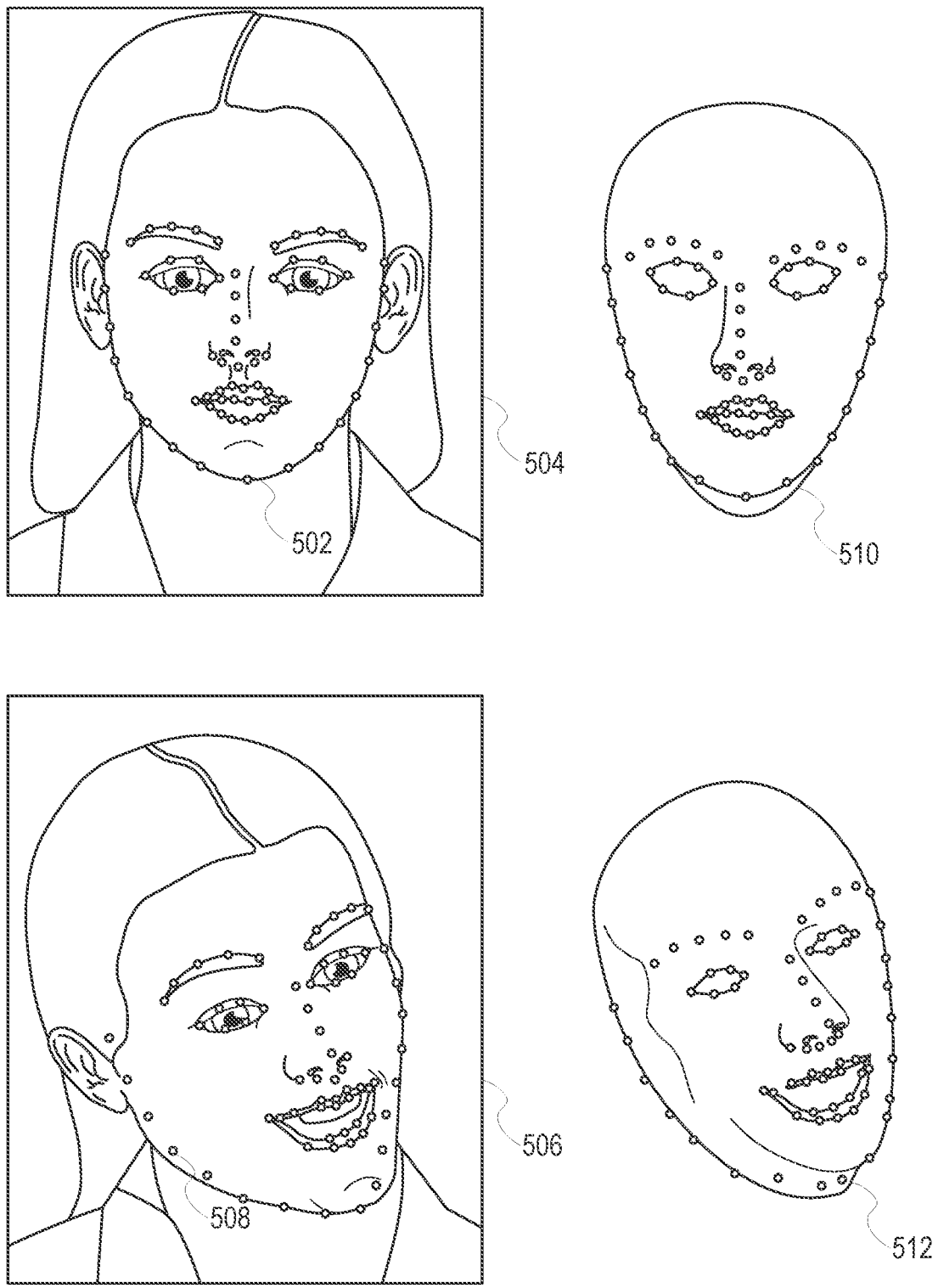
FIG. 5 is a depiction of tracked facial landmarks, and corresponding facial models, according to certain example embodiments.

FIG. 5 is a depiction of tracked facial landmarks 502 and 508, and corresponding facial models 510 and 512, according to certain example embodiments. As seen in FIG. 5, the tracked facial landmarks 502 and 508 comprises a set of points, wherein each point corresponds to a facial landmark identified by the facial animation system 124, based on video data 504 and 506, respectively.

The facial animation system 124 receives video data 504 and 506, and tracks the facial landmarks 502 and 508, wherein the facial landmarks 502 and 508 correspond to the semantic facial features of a human face, such as the contour of eyes, lips, nose, and eyebrows. The video data 504 and 506 comprises a video component and an audio component. In some embodiments, the facial animation system 124 may parse the video data 504 and 506 to process the audio data and video data separate from one another.

The facial animation system 124 constructs the facial models 510 and 512 based on the tracked facial landmarks 502 and 508, and the audio components of the video data 504 and 506. In some embodiments, the system determines an identity of the user, wherein the identity is determined based on one or more of the facial landmarks of the user's face, or based on an expression of the user, wherein the expression is based on an orientation of the facial landmarks.

FIG. 6 is a flowchart illustrating a method 600 for generating an animated facial model, as depicted in FIG. 5, based on audio and video data, according to certain example embodiments. Operations of the method 600 may be performed by the modules described above with respect to FIG. 3. As shown in FIG. 6, the method 600 includes one or more operations 602, 604, 606, 608, 610, 612, and 614.

At operation 602, the video module 304 receives audio data and video data at a client device (e.g., client device 102 of FIG. 1). For example, the client device 102 may record or otherwise capture a video comprising an audio component and a video component. The video module 304 may separate the audio component and the video component form the video, in order to process the components separately.

At operation 604, the speech recognition module 302 determines a phone sequence of the audio data (the audio component of the recorded video). The audio data may for example include a speech signal comprising phonemes, wherein a phoneme is a unit of speech that differentiates one word from another in the speech signal. For example, one phoneme may consist of a sequence of closure, burst, and aspiration events; or, a dipthong may transition from a back vowel to a front vowel. A speech signal may therefore be described not only by what phonemes it contains, but also a sequence, or alignment of the phonemes. Phoneme alignment may therefore be described as a "time-alignment" of phonemes in a waveform, in order to determine an appropriate sequence and location of each phoneme in a speech signal.

In some embodiments, the speech recognition module 302 may perform full scale Large Vocabulary Continuous Speech Recognition (LVCSR), with a strong language model for word lattice generation and phoneme sequence estimation in order to determine the sequence of the phonemes in the speech signal.

At operation 606, the video module 304 determines locations of a set of facial landmarks based on the video component of the video data. In some example embodiments, facial landmarks detection may include algorithms to perform facial alignment with an ensemble of regression trees. Facial landmarks correspond to semantic facial features of a human face, such as the contour of eyes, lips and eyebrows, the tip of a nose, etc. In some embodiments, the video module 304 determines an identity of a user depicted in the video data, wherein the identity is based on an orientation of the identified facial landmarks. In further embodiments, the video module 304 may access user profile data based on the identity of the user, wherein the user profile data includes a set of display specifications that define how a facial model is to be presented. For example, the user profile may indicate specific colors, interface elements, or a selection of a specific bitmoji (e.g., avatar).

At operations 608 and 610, the modeling module 306 generates a first facial model based on the tracked facial landmarks, and a second facial model based on the phone sequence of the audio data, and at operation 612, the modeling module 306 generates a composite facial model (e.g., facial model 510 and 512) based on the first facial model and the second facial model. In some embodiments, the composite facial model may also be based on the display specifications from the user profile of the identified user.

At operation 614, the presentation module 308 generates and causes display of a presentation of the composite facial model at a client device (e.g., client device 102). In some embodiments, the presentation module 308 may display the presentation of the composite facial model within a graphical user interface. In further embodiments, the presentation module 308 may stylize or alter the composite facial model with the addition of graphical elements, or filters which alter the display of the composite facial model.

In some example embodiments, the method 600 is performed in real-time, as video data is collected at the client device 102. For example, a user of the client device 102 may collect or otherwise record the video data at the client device 102 (or through a remote device), and the facial animation system 124 may receive and process the video data based on the method 500, to display the composite facial model at a client device 102 (e.g., a device of another user).

In some embodiments, the composite facial model may be presented within an ephemeral message delivered from a first client device to a second client device. For example, a user of the client device 102 may record a message that include video data, and the facial animation system 124 may process the video data based on the method 500, in order to generate and present an ephemeral message that includes a presentation of the composite facial model.

FIG. 7 is a flowchart illustrating a method 700 for generating an animated facial model, as depicted in FIG. 5, based on audio and video data, according to certain example embodiments. Operations of the method 700 may be performed by the modules described above with respect to FIG. 3. As shown in FIG. 7, the method 700 includes one or more operations 702, 704, 706, 708, and 710.

At operation 702, the modeling module 306 detects a loss of audio data, video data, or both. For example, the audio or video received at the client device 102 may be corrupted or obscured, resulting in an incomplete or fragmented facial model.

At operation 704, the video module 304 parses the video data to identify a first frame. For example, the first frame may indicate a starting point of the video data.

At operation 706, the video module 304 determines locations of the set of facial landmarks within the first frame of the video data, and at operation 708, defines the locations of the facial landmarks in the first frame as a "neutral expression."

At operation 710, in response to the detecting the loss of the audio and video data, the presentation module 308 alters a presentation of the composite facial model based on the locations of the set of facial landmarks from the neutral expression.

Software Architecture

Figure 8:
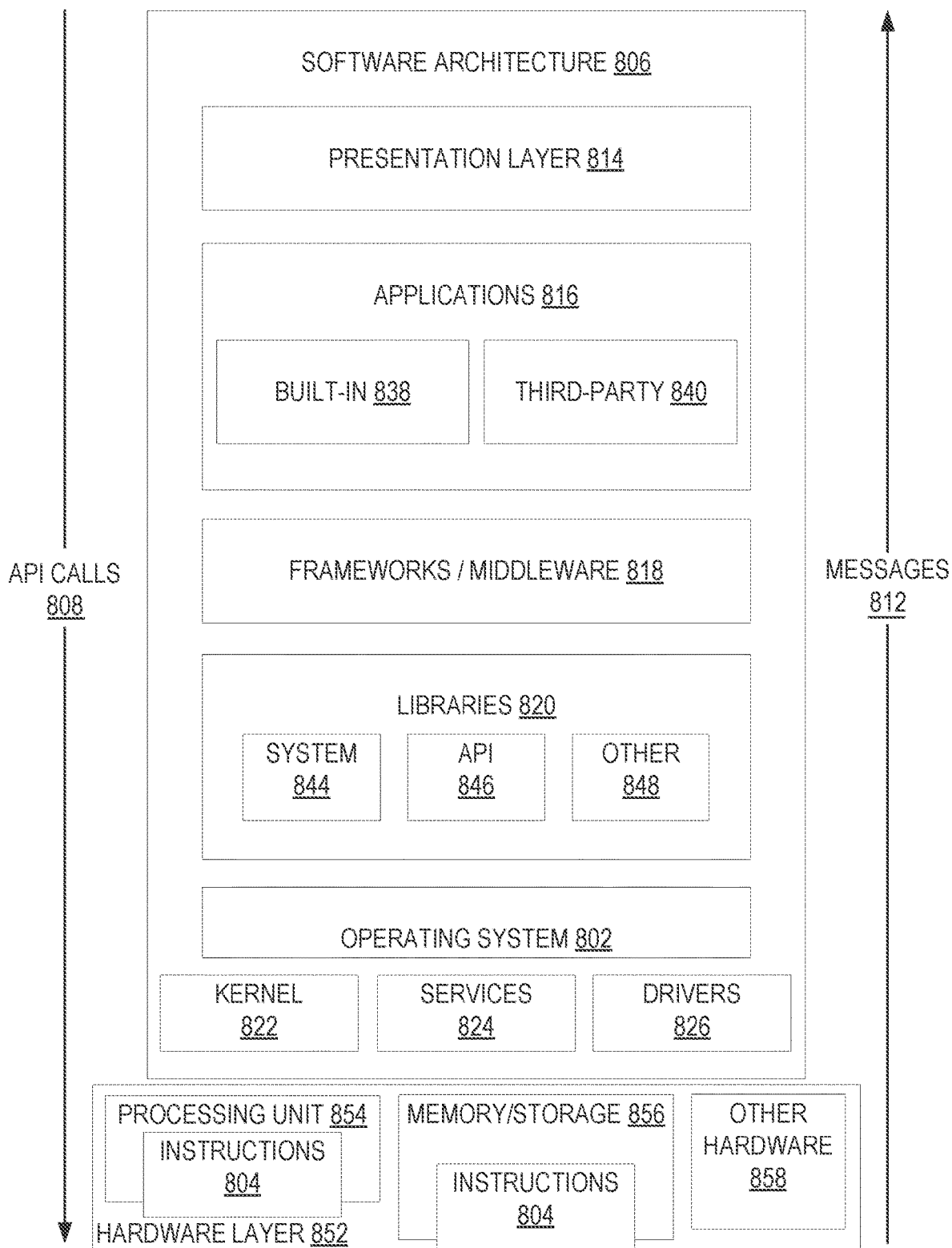
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
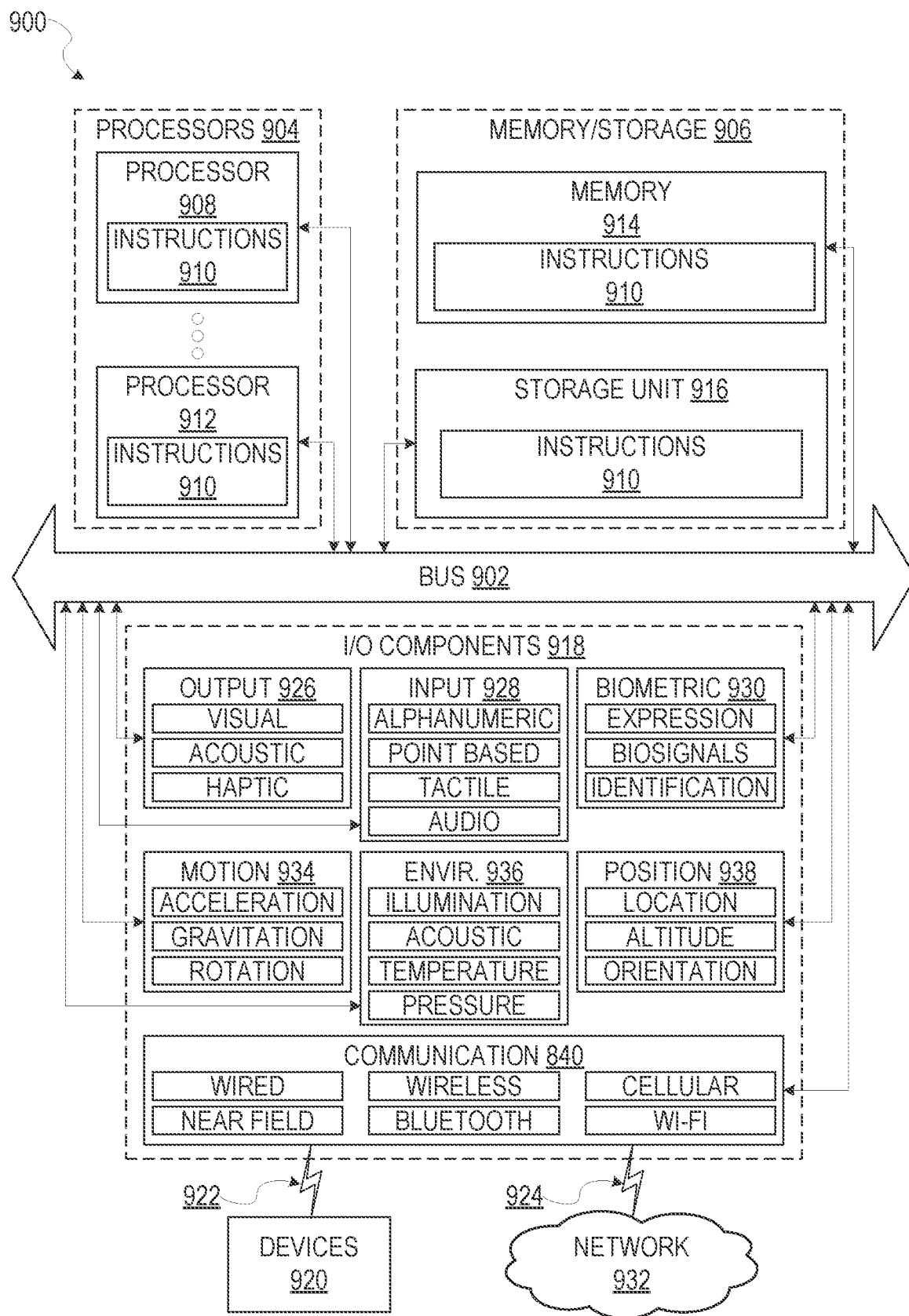
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLST™)" in this context refers to a recurrent neural network (RNN) architecture that remembers values over arbitrary intervals. Stored values are not modified as learning proceeds. RNNs allow forward and backward connections between neurons. BLST™ are well-suited for the classification, processing, and prediction of time series, given time lags of unknown size and duration between events.

What is claimed is:

1. A method comprising:
    accessing a data stream that comprises audio data and video data at a client device, the video data comprising a set of facial landmarks;
    identifying a user profile that corresponds with the set of facial landmarks from the video data of the data stream, the user profile comprising user profile data;
    generating a facial model based on the user profile data;

causing display of a presentation of the facial model;
animating the presentation of the facial model based on the audio data;
detecting a loss in the audio data of the data stream;
accessing a first frame of the video data in response to the loss in the data stream; and
causing display of the presentation of the facial model based on at least the first frame.

2. The method of claim 1, wherein the generating the facial model includes:
generating a first facial model based on the audio data;
generating a second facial model based on the video data; and
generating a composite facial model based on the first facial model and the second facial model.

3. The method of claim 1, wherein the facial model includes a three-dimensional (3D) facial model.

4. The method of claim 1, wherein the client device is a first client device, and the causing display of the facial model includes:
causing display of the facial model at a second client device.

5. The method of claim 1, wherein the user profile data includes a selection of a user avatar, and wherein the generating the facial model includes:
generating a facial model based on the selection of the user avatar.

6. The method of claim 1, wherein the animating the presentation of the facial model based on the audio data includes:
determining a phone sequence based on the audio data.

7. The method of claim 1, wherein the causing display of the presentation of the facial model includes:
causing display of an ephemeral message that includes the presentation of the facial model.

8. A system comprising:
a memory; and
at least one hardware processor coupled to the memory and comprising instructions that causes the system to perform operations comprising:
accessing a data stream that comprises audio data and video data at a client device, the video data comprising a set of facial landmarks;
identifying a user profile that corresponds with the set of facial landmarks from the video data of the data stream, the user profile comprising user profile data;
generating a facial model based on the user profile data;
causing display of a presentation of the facial model;
animating the presentation of the facial model based on the audio data;
detecting a loss in the audio data of the data stream;
accessing a first frame of the video data in response to the loss in the data stream; and
causing display of the presentation of the facial model based on at least the first frame.

9. The system of claim 8, wherein the generating the facial model includes:
generating a first facial model based on the audio data;
generating a second facial model based on the video data; and
generating a composite facial model based on the first facial model and the second facial model.

10. The system of claim 8, wherein the facial model includes a three-dimensional (3D) facial model.

11. The system of claim 8, wherein the client device is a first client device, and the causing display of the facial model includes:
causing display of the facial model at a second client device.

12. The system of claim 8, wherein the user profile data includes a selection of a user avatar, and wherein the generating the facial model includes:
generating a facial model based on the selection of the user avatar.

13. The system of claim 8, wherein the animating the presentation of the facial model based on the audio data includes:
determining a phone sequence based on the audio data.

14. The system of claim 8, wherein the causing display of the presentation of the facial model includes:
causing display of an ephemeral message that includes the presentation of the facial model.

15. A non-transitory machine-readable storage medium comprising instructions that, when executed by one or more processors of a machine, cause the machine to perform operations comprising:
accessing a data stream that comprises audio data and video data at a client device, the video data comprising a set of facial landmarks;
identifying a user profile that corresponds with the set of facial landmarks from the video data of the data stream, the user profile comprising user profile data;
generating a facial model based on the user profile data;
causing display of a presentation of the facial model;
animating the presentation of the facial model based on the audio data;
detecting a loss in the audio data of the data stream;
accessing a first frame of the video data in response to the loss in the data stream; and
causing display of the presentation of the facial model based on at least the first frame.

16. The non-transitory machine-readable storage medium of claim 15, wherein the generating the facial model includes:
generating a first facial model based on the audio data;
generating a second facial model based on the video data; and
generating a composite facial model based on the first facial model and the second facial model.

17. The non-transitory machine-readable storage medium of claim 15, wherein the facial model includes a three-dimensional (3D) facial model.

18. The non-transitory machine-readable storage medium of claim 15, wherein the client device is a first client device, and the causing display of the facial model includes:
causing display of the facial model at a second client device.

19. The non-transitory machine-readable storage medium of claim 15, wherein the user profile data includes a selection of a user avatar, and wherein the generating the facial model includes:
generating a facial model based on the selection of the user avatar.

20. The non-transitory machine-readable storage medium of claim 15, wherein the animating the presentation of the facial model based on the audio data includes:
determining a phone sequence based on the audio data.

* * * * *